(12) United States Patent
Park

(10) Patent No.: US 12,360,577 B2
(45) Date of Patent: Jul. 15, 2025

(54) IMAGE CAPTURE METHOD AND ELECTRONIC DEVICE THEREFOR

(71) Applicant: Samsung Electronics Co., Ltd., Suwon-si (KR)

(72) Inventor: Juyeol Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 17/993,270

(22) Filed: Nov. 23, 2022

(65) Prior Publication Data
US 2023/0090716 A1 Mar. 23, 2023

Related U.S. Application Data

(63) Continuation of application No. PCT/KR2021/004579, filed on Apr. 12, 2021.

(30) Foreign Application Priority Data

Jun. 5, 2020 (KR) .................. 10-2020-0068652

(51) Int. Cl.
*G06F 1/16* (2006.01)
*G06F 3/04842* (2022.01)

(52) U.S. Cl.
CPC .......... *G06F 1/1686* (2013.01); *G06F 1/1641* (2013.01); *G06F 1/1643* (2013.01);
(Continued)

(58) Field of Classification Search
None
See application file for complete search history.

(56) References Cited

U.S. PATENT DOCUMENTS 9,495,095 B2 11/2016 Park et al.
10,007,475 B2 6/2018 Jeon et al.
(Continued)

FOREIGN PATENT DOCUMENTS

CN 110413167 A 11/2019
KR 10-2016-0018769 A 2/2016
(Continued)

OTHER PUBLICATIONS

European Office Action dated May 13, 2024, issued in European Patent Application No. 21816843.3.
(Continued)

*Primary Examiner* — Anthony Q Edwards
*Assistant Examiner* — Rashen E Morrison
(74) *Attorney, Agent, or Firm* — Jefferson IP Law, LLP

(57) ABSTRACT

A flexible electronic device is provided. The flexible electronic device includes a first housing, a second housing, a hinge structure arranged between the first housing and the second housing, a flexible display, at least one sensor, at least one processor, and a memory. The flexible electronic device can determine, when an image capture input on the flexible display is detected, a form by using the at least one sensor, determine, when a first form is determined, whether different functions are being executed in a first area and a second area of the flexible display, and capture, when it is determined that different functions are being executed, at least a portion of the area from which the image capture input has been detected.

18 Claims, 12 Drawing Sheets

(52) U.S. Cl.
CPC .......... *G06F 1/1652* (2013.01); *G06F 1/1681* (2013.01); *G06F 3/04842* (2013.01)

(56) References Cited

U.S. PATENT DOCUMENTS

| | | | |
|---|---|---|---|
| 10,133,310 B2 * | 11/2018 | Kim | G06F 3/147 |
| 10,152,088 B2 | 12/2018 | Ka et al. | |
| 10,564,675 B2 | 2/2020 | Ka et al. | |
| 10,809,844 B2 | 10/2020 | Kang et al. | |
| 11,048,379 B2 | 6/2021 | Cheong et al. | |
| 11,275,466 B2 | 3/2022 | Kang et al. | |
| 2016/0132074 A1 * | 5/2016 | Kim | G06F 1/1652 |
| | | | 345/173 |
| 2016/0313883 A1 | 10/2016 | Zhang | |
| 2017/0091340 A1 | 3/2017 | Yoon et al. | |
| 2023/0176612 A1 * | 6/2023 | Tyagi | G06F 1/1616 |

FOREIGN PATENT DOCUMENTS

| | | |
|---|---|---|
| KR | 10-2016-0038510 A | 4/2016 |
| KR | 10-2016-0057225 A | 5/2016 |
| KR | 10-1698106 B1 | 1/2017 |
| KR | 10-2017-0036317 A | 4/2017 |
| KR | 10-2017-0069103 A | 6/2017 |
| KR | 10-2017-0130331 A | 11/2017 |
| KR | 10-2018-0015532 A | 2/2018 |
| KR | 10-1880653 B1 | 8/2018 |
| KR | 10-1962445 B1 | 3/2019 |
| WO | 2020/107258 A1 | 6/2020 |

OTHER PUBLICATIONS

Extended European Search Report dated Oct. 25, 2023, issued in European Patent Application No. 21816843.3.
Korean Office Action dated Jun. 2, 2025, issued in a Korean Patent Application No. 10-2020-0068652.

* cited by examiner

IMAGE CAPTURE METHOD AND ELECTRONIC DEVICE THEREFOR

CROSS-REFERENCE TO RELATED APPLICATION(S)

This application is a continuation application, claiming priority under § 365(c), of an International application No. PCT/KR2021/004579, filed on Apr. 12, 2021, which is based on and claims the benefit of a Korean patent application number 10-2020-0068652, filed on Jun. 5, 2020, in the Korean Intellectual Property Office, the disclosure of which is incorporated by reference herein in its entirety.

BACKGROUND

1. Field

The disclosure relates to a method for capturing an image and an electronic device therefor. More particularly, the disclosure relates to a foldable electronic device for obtaining angle information of a hinge structure using a sensor, determining a state of the foldable electronic device based on the angle information, and providing different capture functions according to the state of the foldable electronic device and/or the state of providing screens of the display, thus providing convenience to the user.

2. Description of Related Art

An electronic device may visually provide a variety of content (e.g., an image, text, or video) to a user through a display. In addition, techniques for increasing the display surface of a mobile device are being developed. To improve the portability and display size of the mobile device, the form of the mobile device may be changed. For example, a portion of the mobile device may be folded or extended.

More particularly, a foldable electronic device including a flexible display capable of being be folded or unfolded has recently been released. For example, when the foldable electronic device is an unfolded state, a user may be provided with various functions through a relatively wide display screen. As another example, when the foldable electronic device is in a folded state, a user may conveniently grip and use the foldable electronic device.

The electronic device may detect a key input and/or a specified touch input (e.g., palm touch, swipe touch, or multi-touch) and perform a capture function to capture a screen displayed on a display in response to the detected input.

The above information is presented as background information only to assist with an understanding of the disclosure. No determination has been made, and no assertion is made, as to whether any of the above might be applicable as prior art with regard to the disclosure.

SUMMARY

When an electronic device has a plurality of display screens or is a foldable electronic device, the user may execute different functions on the plurality of display screens or display screens logically and/or physically separated based on a folding line. The user may require a function to immediately capture at least a portion of display areas in which different functions are executed.

Aspects of the disclosure are to address at least the above-mentioned problems and/or disadvantages and to provide at least the advantages described below. Accordingly, aspect of the disclosure is to provide an image capture method and electronic device therefor.

Additional aspects will be set forth in part in the description which follows and, in part, will be apparent from the description, or may be learned by practice of the presented embodiments.

In accordance with an aspect of the disclosure, a flexible electronic device is provided. The flexible electronic device includes a first housing, a second housing, a hinge structure disposed between the first housing and the second housing, a flexible display, at least one sensor, at least one processor, and a memory operatively connected to the at least one processor, and the memory may store one or more instructions which, when executed, cause the at least one processor to determine a form of the flexible electronic device using the at least one sensor when an image capture input is detected in at least one area of the flexible display, determine whether different functions are executed in a first area and a second area of the flexible display divided around the hinge structure when the form of the flexible electronic device is determined to be a first form, and capture at least a portion of an area in which the image capture input is detected among the first area and the second area of the flexible display when it is determined that the different functions are being executed in the first area and the second area.

In accordance with an aspect of the disclosure, a method for providing a function of capturing one area of a flexible display in an electronic device is provided. The method includes determining a form of the electronic device using at least one sensor when an image capture input is detected in at least one area of the flexible display, determining whether different functions are executed in a first area and a second area of the flexible display divided around a hinge structure when the form of the electronic device is determined to be a first form, and capturing at least a portion of an area in which the image capture input is detected among the first area and the second area of the flexible display when it is determined that the different functions are being executed in the first area and the second area.

According to various embodiments disclosed herein, the foldable electronic device may obtain angle information of a hinge structure using a sensor, determine a state of the foldable electronic device based on the angle information, and provide different capture functions according to the state of the foldable electronic device and/or the state of providing screens of the display, thus providing convenience to the user.

According to various embodiments disclosed herein, the foldable electronic device may detect a user's specified input and set an area of the display to be captured based on at least a part of the detected information, thereby intuitively storing the captured image without a secondary operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modification, of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
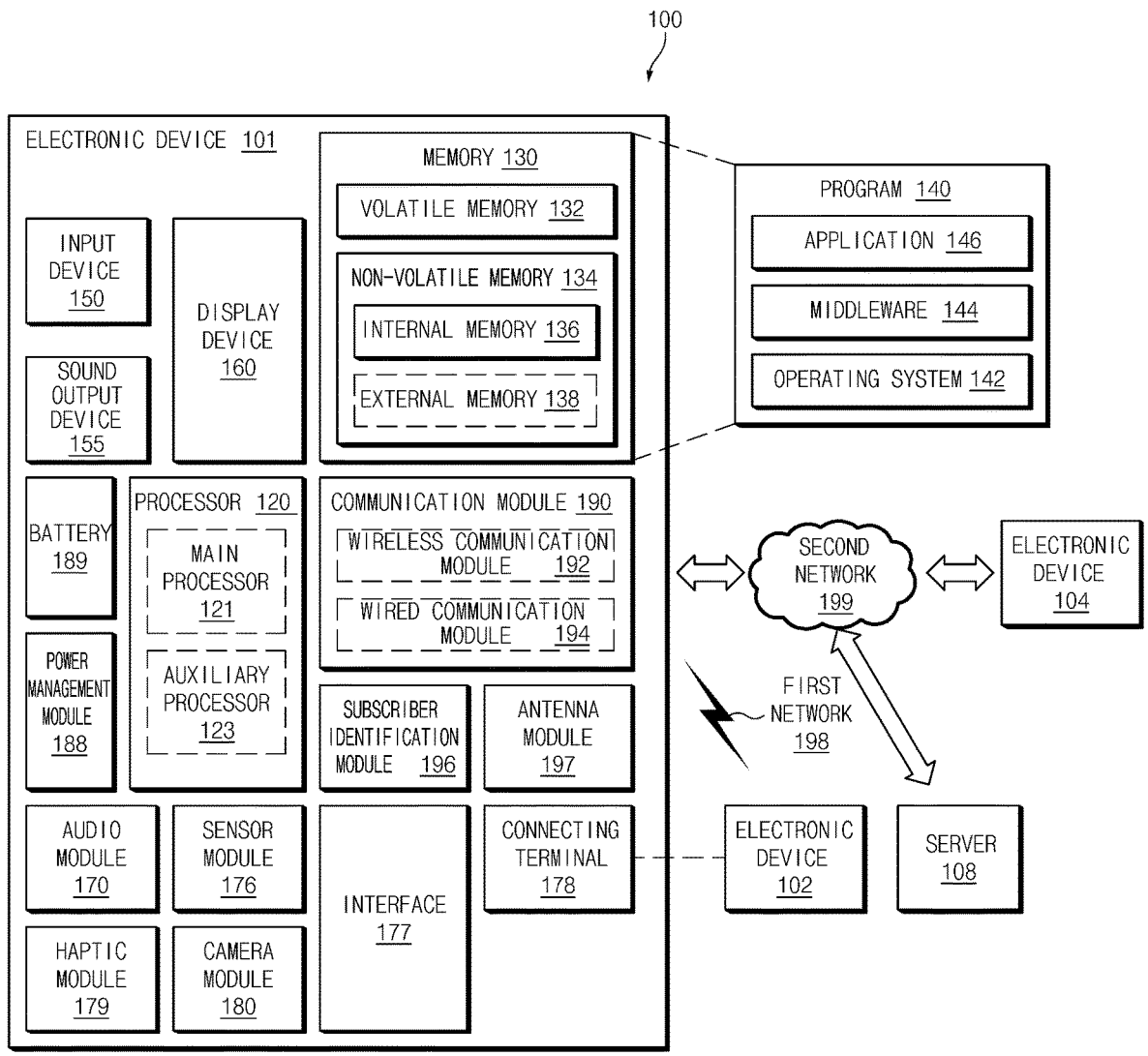
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display device 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display device 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning.

Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of at least one non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
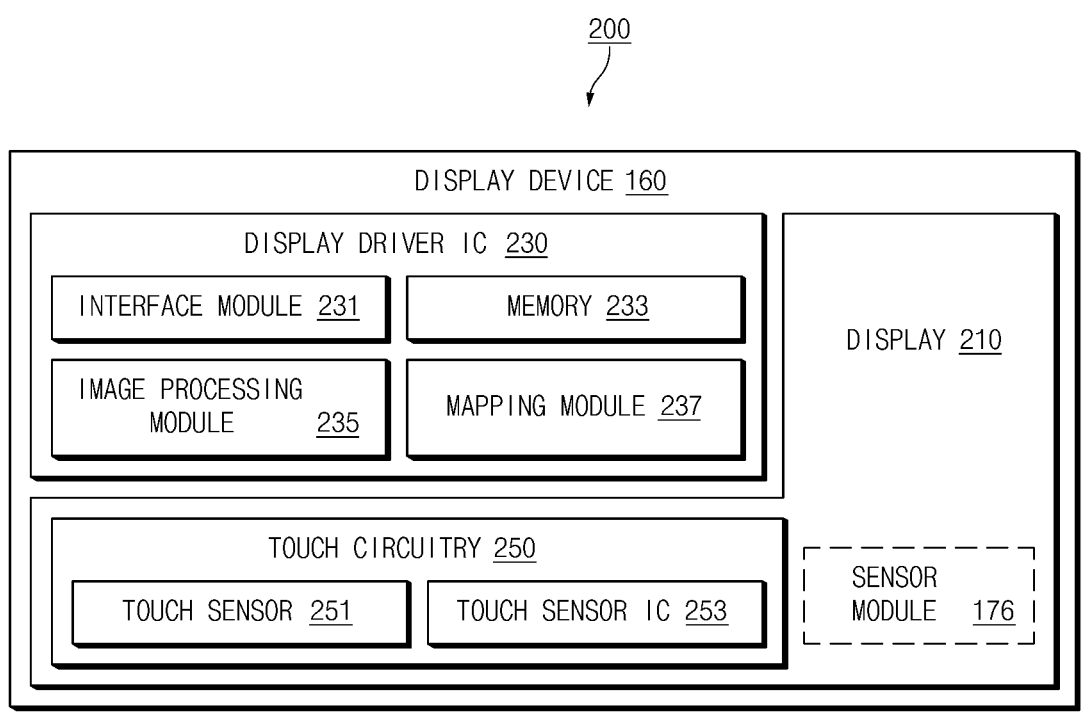
FIG. 2 is a block diagram of a display module according to an embodiment of the disclosure.

FIG. 2 is a block diagram 200 illustrating a display device according to an embodiment of the disclosure.

Referring to FIG. 2, the display device 160 may include a display 210 and a display driver integrated circuit (DDI) 230 to control the display 210. The DDI 230 may include an interface module 231, a memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment of the disclosure, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment of the disclosure, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment of the disclosure, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment of the disclosure, the display device 160 may further include the touch circuitry 250. The touch circuitry 250 may include a touch sensor 251 and a touch sensor IC 253 to control the touch sensor 251. The touch sensor IC 253 may control the touch sensor 251 to detect a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment of the disclosure, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment of the disclosure, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment of the disclosure, the touch sensor 251 or the sensor module 176 may be disposed between pixels in a pixel layer of the display 210, or over or under the pixel layer.

Figure 3:
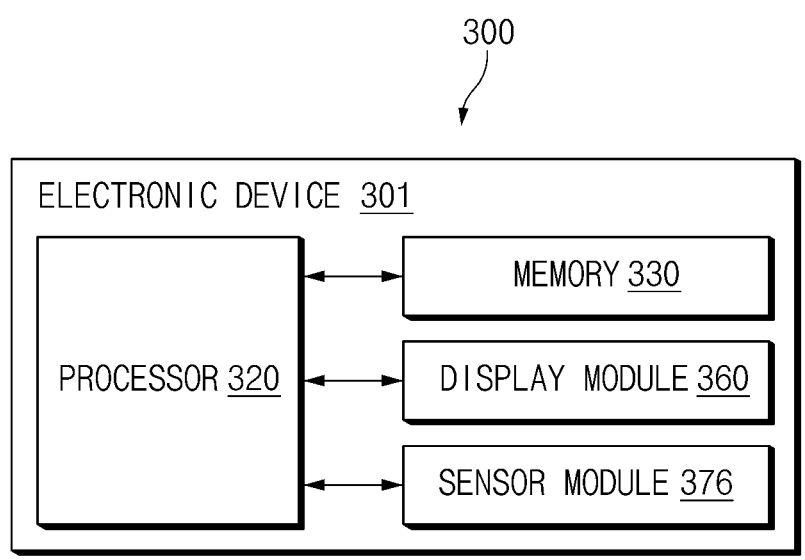
FIG. 3 is a block diagram illustrating a configuration of a foldable electronic device according to an embodiment of the disclosure.

FIG. 3 is a block diagram 300 illustrating a configuration of an electronic device according to an embodiment of the disclosure.

Referring to FIG. 3, an electronic device 301 (e.g., the electronic device 101 of FIG. 1) may include a processor 320 (e.g., the processor 120 of FIG. 1), a memory 330 (e.g., the memory 130 of FIG. 1), a display module 360 (e.g., the display device 160 of FIGS. 1 and 2), and/or a sensor module 376 (e.g., the sensor module 176 of FIG. 1). The configuration of the electronic device illustrated in FIG. 3 is merely an example and embodiments of the disclosure are not limited thereto. For example, the electronic device may not include at least one of the components illustrated in FIG. 3. As another example, the electronic device may further include a component not shown in FIG. 3.

The processor 320 may be operatively connected to the memory 330, the display module 360, and/or the sensor module 376. For example, the processor 320 may detect a folding angle of the electronic device 301 based on the information obtained by using at least one sensor in the sensor module 376 (e.g., an acceleration sensor, a gyro sensor, a switch (e.g., a contact switch), and/or a magnetic sensor (e.g., a Hall sensor)) and determine a form of the electronic device 301 based on the folding angle. For example, when the folding angle detected using the at least one sensor exceeds a specified value, the processor 320 may determine the form of the electronic device 301 as a first form. For example, when the folding angle detected using the at least one sensor does not exceed the specified value, the processor 320 may determine the form of the electronic device 301 as a second form. The first form and the second form may be referred to as an unfolding form and a folding form, respectively. The specified value serving as a criterion for determining the form of the electronic device 301 may refer to a value arbitrarily set by a user, or may refer to a value preset by the processor 320. The first and second forms of the electronic device are described as being distinguished based on the folding angle, but the disclosure is not limited thereto. For example, the electronic device may be a slideable electronic device including a display capable of extending/retracting horizontally and/or vertically. In this case, the first form of the electronic device may mean a state in which the display is rolled and accommodated in a housing. For another example, the second form of the electronic device may mean a state in which the display is unrolled and extended.

The processor 320 may determine the form of the electronic device 301 and determine whether different functions are being executed in a first area and a second area of the display. For example, the division of the first area and the second area may be logical division of a display area. The processor 320 may divide the display area into the first area and the second area based on a hinge structure disposed between a first housing and a second housing of the electronic device 301. Meanwhile, the above-described division of the display area is not limited to logical division. The first area and the second area may mean physically separate areas. For example, the first area and the second area may each mean one area of a separate display device included in one electronic device 301. The number of divided areas, the size and resolution of each area, and/or whether content that may be output on each area is limited may be changed according to a user's intention.

When it is determined that different functions are being executed in the first area and the second area, the processor 320 may be configured to capture an area corresponding to at least one area (e.g., the first area or the second area) of a display on which an external input is detected. For example, the external input may be referred to as a palm touch input of the user. For example, the palm touch input may refer to a touch input in which a hand blade, which is a portion from the tip of the little finger to the wrist, contacts an area of the display when the palm is opened. The user may perform a palm touch input in the form of swiping from left to right or right to left while touching the display with the hand blade. The processor 320 may obtain information associated with an external input by using at least one sensor (e.g., the touch sensor 251 of FIG. 2) included in the sensor module 376. The information may include a swipe direction of a touch input, a touch area, and/or a touch distance. The processor 320 may determine an area to be captured on the display based on the information. The processor 320 may determine whether an external input is recognized by using at least one sensor (e.g., a proximity sensor and/or foreign object detection (FOD)) included in the sensor module 376. For example, the processor 320 may identify that no more external input is detected on the display using at least one sensor, and allow the electronic device 301 to execute a capture function based on the ending time of the external input.

For example, when it is determined that information associated with the external input does not satisfy a predefined condition, the processor 320 may continuously display a function that has been executed before the external input is detected on the display. As another example, when it is determined that the information associated with the external input does not satisfy the predefined condition, the processor 320 may display a user interface including guide information associated with the capture function on an area of the display. For example, the user interface including guide information may include information on a swipe direction of a touch input, a touch area, and/or a touch distance.

The memory 330 may store an operation history of the electronic device 301 displayed on the display module 360.

For example, when the electronic device 301 includes a plurality of display modules 360, the memory 330 may classify and store the operation history of the electronic device 301 displayed on each display module 360. For example, the operation history may include a user interface including applications displayed on each display module 360 and/or information associated with the different applications.

The memory 330 may store at least one predefined condition associated with the capture function. For example, the predefined condition may include a condition for a swipe direction, a touch area, and/or a touch distance of an external input (e.g., a swipe touch input and/or a palm touch input). The predefined condition may be a value set by the electronic device 301 itself or a value arbitrarily set by a user.

Meanwhile, although a plurality of touch inputs (e.g., a swipe touch input and/or a palm touch input) are provided as an example of the external input, the external input is not limited thereto. According to an embodiment of the disclosure, the external input may refer to a pressure input to a button included in the electronic device. The electronic device may include a plurality of buttons (e.g., a first button, a second button, and a third button) as an input interface for a user input. For example, when a pressure input (e.g., long press input) for the second button is detected for more than a specified time period (e.g., about 1 second) while the pressure input is being applied to the first button, the electronic device may perform the capture function for one area of the display. When a pressure input (e.g., long press input) for the second button is detected for less than the specified time period while the pressure input is being applied to the first button, the electronic device may determine an area on the display to be captured (e.g., the first area, the second area, or the entire area) by toggling. As another example, when a pressure input (e.g., a long press input) exceeding a specified time period is applied to the first button and the second button or the first button and the third button, the electronic device may perform the capture function for the first area or the second area. In this case, when a pressure input exceeding a specified time period is simultaneously applied to the first button, the second button, and the third button, the electronic device may perform a capture function for the entire area of the display including the first area and the second area.

The display module 360 may display information processed by the electronic device 301. The display module 360 may include various types of displays (e.g., the display 210 of FIG. 2). The display may include a flexible display, and the flexible display may refer to a display in which at least a portion of the display has flexibility. The flexible display may be folded or unfolded around a hinge structure included in the electronic device 301. For example, the display module 360 may display information on different functions in each area (e.g., the first area and the second area) of the display divided around the hinge structure under the control of the processor 120.

Hereinafter, electronic devices whose forms are changed in FIGS. 4, 5, and 6 will be described. According to various embodiments of the disclosure, an image capturing method is described as being executed in a foldable electronic device, but is not limited thereto. For example, the image capturing method may be executed in a slideable electronic device and/or a rollable electronic device illustrated in FIG. 5.

Figure 4:
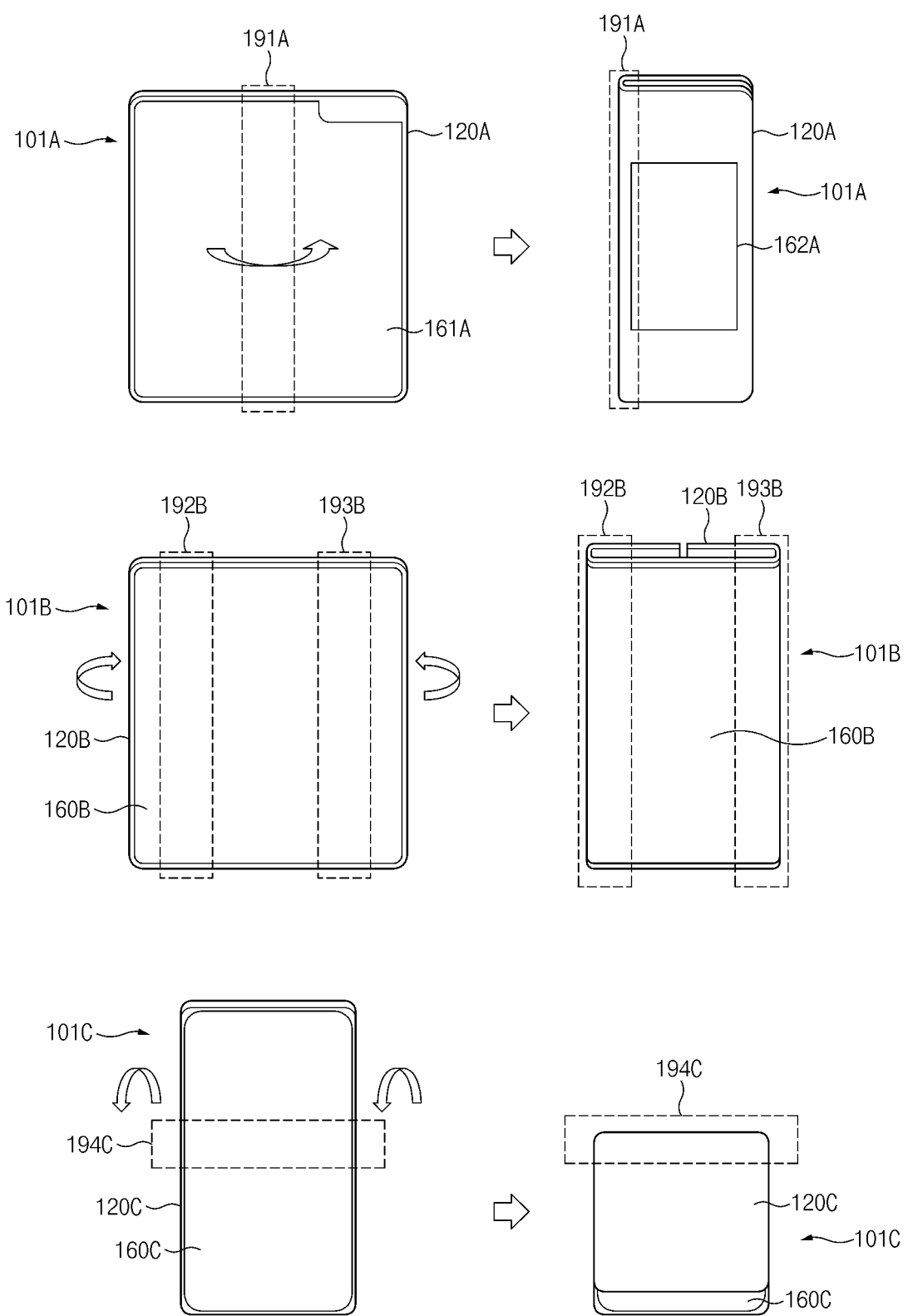
FIG. 4 illustrates electronic devices whose forms are changed according to an embodiment of the disclosure.

FIG. 4 illustrates electronic devices whose forms are changed according to an embodiment of the disclosure.

According to various embodiments of the disclosure, an electronic device (e.g., the electronic device 101 of FIG. 1) may be physically changed according to folding/unfolding. For example, the electronic device may include a housing having flexibility in at least a portion thereof and a display (e.g., the display device 160 of FIG. 1). The electronic device may be folded (e.g., close) or unfolded (e.g., open) around the flexible portion of the electronic device. For example, the flexible portion of the electronic device may be referred to as a folded portion (e.g., a hinge structure). The folded portion may refer to a portion or area in which the form of the electronic device is able to be changed, and is not limited to a specific structure.

According to an embodiment of the disclosure, the first electronic device 101A (e.g., the electronic device 101 of FIG. 1) may be folded from side to side. For example, the first electronic device 101A may be folded around at least a folded portion 191A. For example, the first electronic device 101A may include a flexible first display 161A (e.g., the display device 160 of FIG. 1) in a portion corresponding to the folded portion 191A and a housing 120A. The first electronic device 101A may be folded left and right around the folded portion 191A. The first electronic device 101A may include a second display 162A (e.g., the display device 160 of FIG. 1) exposed to the outside in a folded state.

Referring to FIG. 4, the first electronic device 101A is illustrated as an in-fold electronic device that is folded with the first display 161A inward, but embodiments of the disclosure are not limited thereto. For example, the first electronic device 101A may be an out-fold electronic device or an electronic device supporting both in-fold and out-fold. For another example, although the first display 161A is illustrated as a single display, embodiments of the document are not limited thereto. The first electronic device 101A may include a plurality of displays divided around the folded portion 191A. The housing 120A may also include a plurality of housings divided around the folded portion 191A. As another example, the first electronic device 101A may be a combination of a plurality of electronic devices coupled to be folded around the folded portion 191A. In this case, the plurality of electronic devices may be coupled to each other by a separate structure (e.g., a housing or a hinge).

According to an embodiment of the disclosure, the second electronic device 101B (e.g., the electronic device 101 of FIG. 1) may be folded left and right about a plurality of axes. For example, the second electronic device 101B may include a display 160B having flexibility at least in portions corresponding to a second folded portion 192B and a third folded portion 193B (e.g., the display device 160 of FIG. 1) and a housing 120B. The second electronic device 101B may be folded left and right around the second folded portion 192B and the third folded portion 193B. In FIG. 4, the second electronic device 101B is illustrated as an out-fold electronic device in which the display 160B is folded outward, but embodiments of the disclosure are not limited thereto. For example, the second electronic device 101B may be in-folded at the second folded portion 192B and/or the third folded portion 193B. As another example, the second electronic device 101B may be in-folded at the second folded portion 192B and out-folded at the third folded portion 193B. As another example, although the display 160B is illustrated as a single display, embodiments of the disclosure are not limited thereto. The second electronic device 101B may include a plurality of displays divided along at least one of the second folded portion 192B and the third folded portion 193B. The housing 120B may also include a plurality of housings divided along at least one of the second folded portion 192B and the third folded portion 193B. As another example, the second electronic device 101B may be a combination of a plurality of electronic devices coupled to be folded around the second folded portion 192B and the third folded portion 193B. In this case, for example, the plurality of electronic devices may be coupled to each other by a separate structure (e.g., a housing or a hinge).

According to an embodiment of the disclosure, the third electronic device 101C (e.g., the electronic device 101 of FIG. 1) may be folded up and down. For example, the third electronic device 101C may include a display 160C (e.g., the display device 160 of FIG. 1) having flexibility at least in a portion corresponding to a fourth folded portion 194C and a housing 120C. The third electronic device 101C may be folded vertically around the fourth folded portion 194C. In FIG. 4, the third electronic device 101C is illustrated as an in-fold electronic device that is folded inward of the display 160B, but embodiments of the disclosure are not limited thereto. For example, the third electronic device 101C may be out-folded or in-folded and out-folded in the fourth folded portion 194C. For another example, although the display 160C is illustrated as a single display, embodiments of the disclosure are not limited thereto. The third electronic device 101C may include a plurality of displays divided along the fourth folded portion 194C. The housing 120C may also include a plurality of housings separated along the folded portion 194C. As another example, the third electronic device 101C may be a combination of a plurality of electronic devices coupled to be folded around the folded portion 194C. In this case, the plurality of electronic devices may be coupled to each other by a separate structure (e.g., a housing or a hinge).

The change in physical form of the electronic device (e.g., the first electronic device 101A, the second electronic device 101B, and the third electronic device 101C) shown in FIG. 4 is merely an example, and the embodiments of the disclosure are not limited thereto. For example, the electronic device may be folded or unfolded about any axis.

Figure 5:
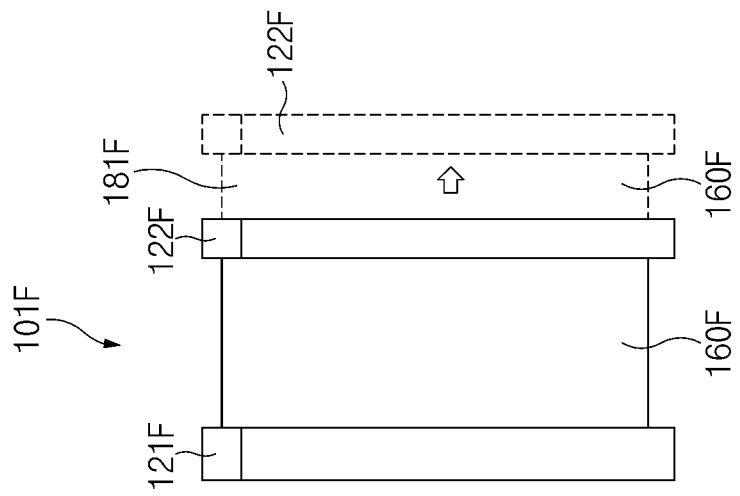
FIG. 5 illustrates electronic devices whose forms are changed according to an embodiment of the disclosure.
Figure 5:
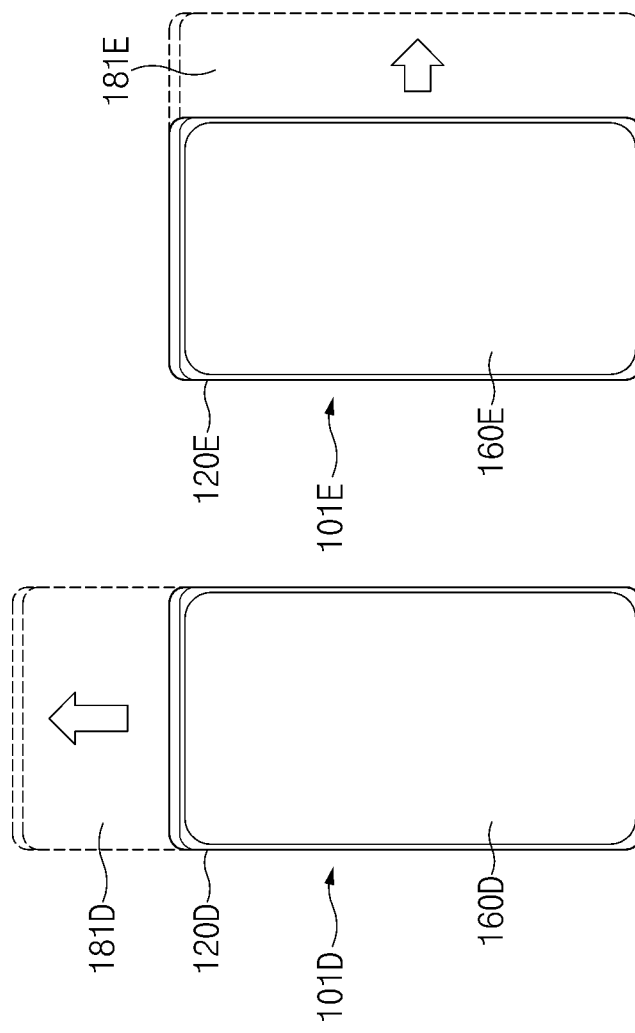

FIG. 5 illustrates electronic devices whose forms are changed according to an embodiment of the disclosure.

Referring to FIG. 5, according to various embodiments, the form of the electronic device may be physically changed according to extending/retracting of a housing of the electronic device. For example, the electronic device may include a housing and/or a display whose at least a portion is able to extend. For example, the electronic device may extend (e.g., open) or retract (e.g., close) in such a manner that a portion of the electronic device extend or retract in a sliding or rolling manner. An extension refers to a portion or area corresponding to a difference between a first form and a second form when the form of the electronic device is changed from the first form to the second form, and is not limited to a specific structure.

According to an embodiment of the disclosure, the fourth electronic device 101D (e.g., the electronic device 101 of FIG. 1) may include an extension 181D that extends/retracts vertically. For example, at least a portion of a housing 120D of the fourth electronic device 101D may include the extension 181D that is able to extend upward of the fourth electronic device 101D. For example, the extension 181D is a portion of the housing 120D, and may extend the housing 120D of the fourth electronic device 101D by moving upward relative to the other portion of the housing 120D. The extension 181D may move independently of a display 160D (e.g., the display device 160 of FIG. 1). For example, the extension 181D may be drawn upward relative to the display 160D. As another example, the extension 181D may be drawn downward relative to the display 160D. According to an embodiment of the disclosure, the extension 181D may include a camera module. For example, the camera module may be set to rotate according to the movement of the extension 181D.

According to an embodiment of the disclosure, the fifth electronic device 101E (e.g., the electronic device 101 of FIG. 1) may include an extension 181E that extends/retracts from side to side. For example, at least a portion of a housing 120E of the fifth electronic device 101E may include the extension 181E that may extend to the right of the fifth electronic device 101E. For example, the extension 181E is a portion of the housing 120E, and may extend the housing 120E of the fifth electronic device 101E by moving to the right relative to the other portion of the housing 120E. The extension 181E may move in conjunction with a display 160E (e.g., the display device 160 of FIG. 1). For example, the extension 181E may extend with the same area as the display 160E.

According to an embodiment of the disclosure, the sixth electronic device 101F (e.g., the electronic device 101 of FIG. 1) may include an extension 181F that extends/retracts from side to side. For example, a display 160F (e.g., the display device 160 of FIG. 1) of the sixth electronic device 101F may be a rollable display. For example, the display 160F may be rolled and accommodated in a first housing 121F. For example, the display 160F may extend between the first housing 121F and a second housing 122F by being unrolled. The extension 181F may be generated as the display 160F is unrolled.

The change in physical form of the electronic device (e.g., the fourth electronic device 101D, the fifth electronic device 101E, and the sixth electronic device 101F) illustrated in FIG. 5 is merely an example, and embodiments of the disclosure are not limited thereto. For example, the electronic device may extend or retract in any direction.

Various changes in form of the electronic device have been described with associated with the first electronic device 101A, the second electronic device 101B, the third electronic device 101C, the fourth electronic device 101D, the fifth electronic device 101E, or the sixth electronic device 101F. These form changes are exemplary, and embodiments of the disclosure are not limited thereto.

Figure 6:
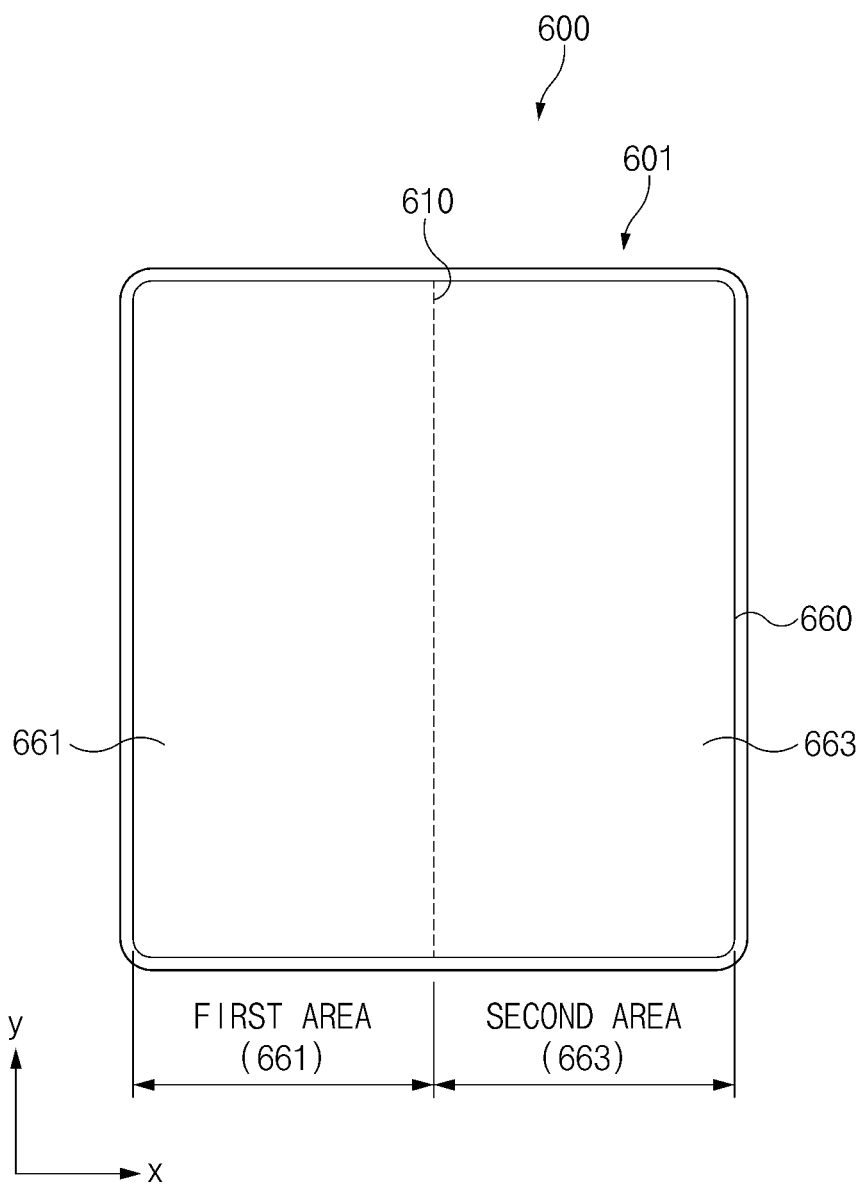
FIG. 6 illustrates one surface of a foldable electronic device according to an embodiment of the disclosure.

FIG. 6 illustrates one surface 600 of a foldable electronic device according to an embodiment of the disclosure.

Referring to FIG. 6, a foldable electronic device 601 (e.g., the electronic device 101 of FIG. 1) may include a display 660. The display 660 may be referred to as a flexible display having at least a portion of which is flexible. The display 660 may be disposed on one surface of the foldable electronic device 601.

According to an embodiment of the disclosure, the display 660 may include a first area 661 and a second area 663. In FIG. 6, the first area 661 and the second area 663 are illustrated as having the same area, but are not limited thereto. For example, the first area 661 may be referred to as a larger area than the second area 663.

According to an embodiment of the disclosure, the first area 661 and the second area 663 may be distinguished based on a hinge structure 610 (e.g., the folded portions 191A, 192B, 193B, and 194C of FIG. 4). For example, the first area 661 and the second area 663 may be folded (e.g., in-folded) to face each other around the hinge structure 610. As another example, the first area 661 and the second area 663 may be folded (e.g., out-folded) to face opposite directions with respect to the hinge structure 610.

The form of the foldable electronic device 601 illustrated in FIG. 6 may be referred to as a first form. For example, the first form may be a state in which the first area 661 and the second area 663 are exposed toward one surface. According to an embodiment of the disclosure, the first form may mean a state in which the foldable electronic device 601 is not folded around the hinge structure 610. In other words, the first form may mean a case in which the folding angle of the foldable electronic device 601 is 180 degrees.

According to an embodiment of the disclosure, the first area 661 and the second area 663 may be logically separated areas which are included in one display. As another example, the first area 661 and the second area 663 may be physically separated areas which are included in different displays.

Figure 7:
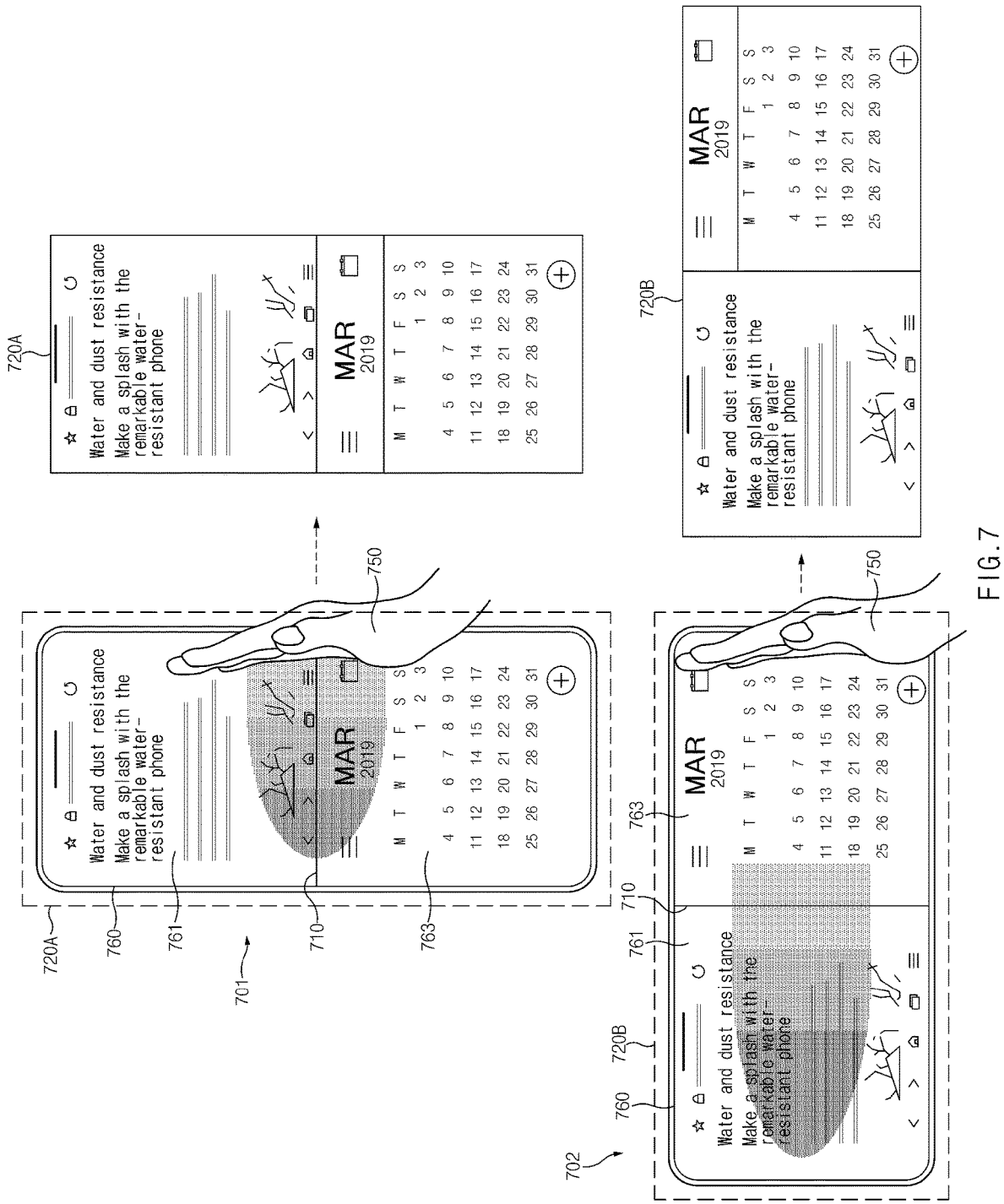
FIG. 7 illustrates an electronic device that executes a capture function in response to an external input according to an embodiment of the disclosure.
Figure 8:
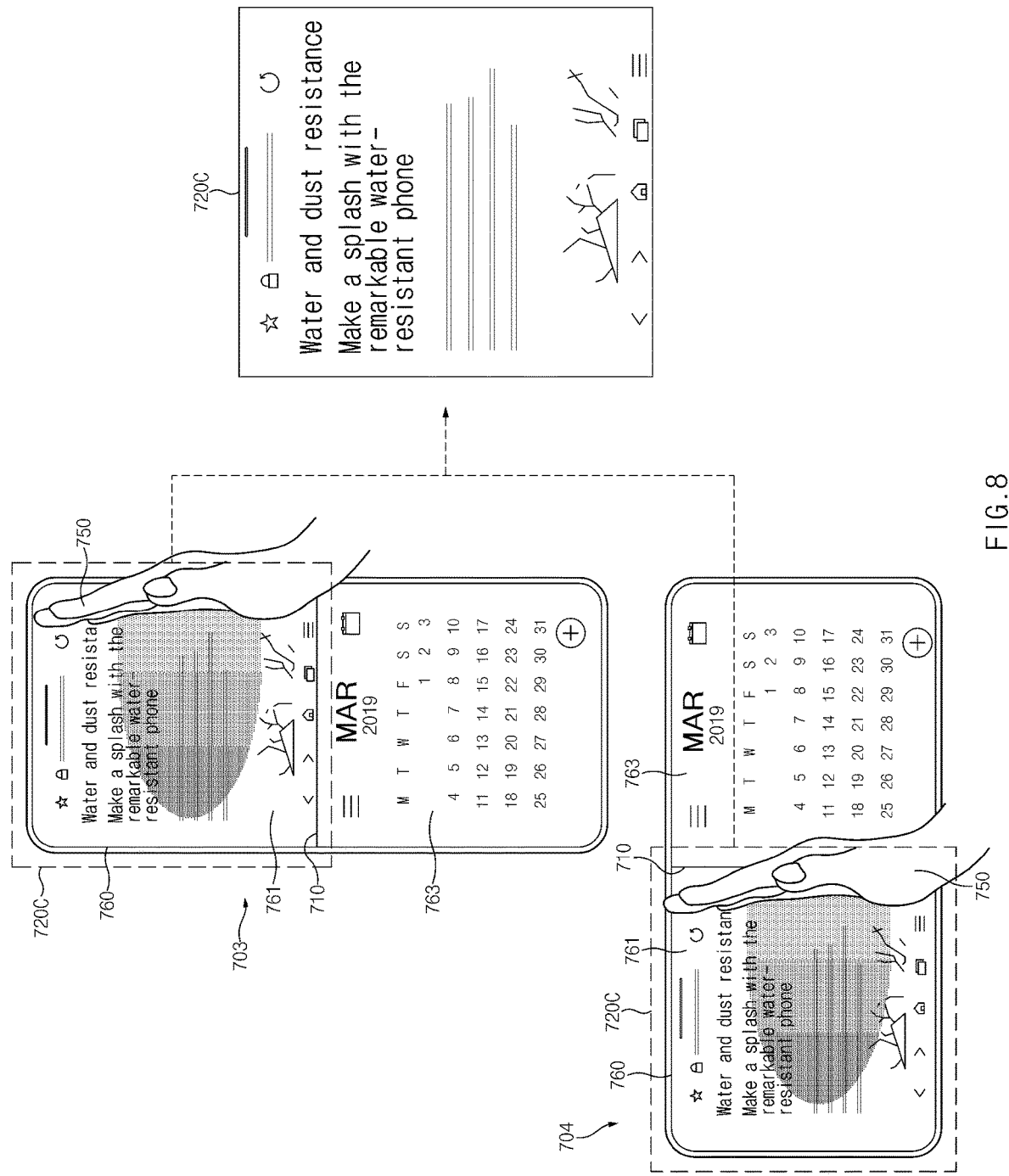
FIG. 8 illustrates an electronic device that executes a capture function in response to an external input according to an embodiment of the disclosure.
Figure 9:
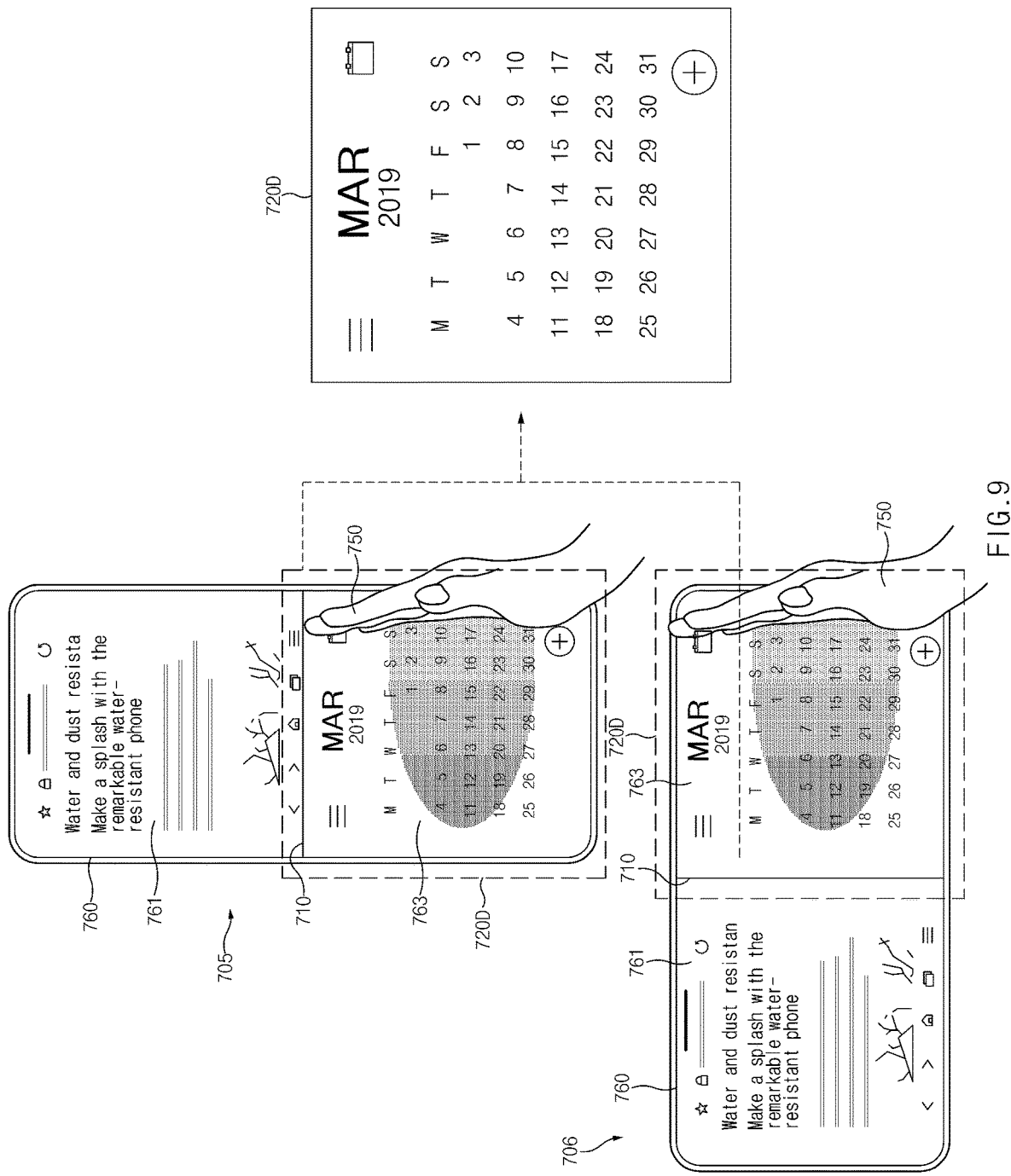
FIG. 9 illustrates an electronic device that executes a capture function in response to an external input according to an embodiment of the disclosure.

Hereinafter, contents in which an electronic device (e.g., the electronic device 101 of FIG. 1) executes a capture function for one area of a display in response to an external input will be given with reference to FIGS. 7, 8, and 9. For example, the electronic device may capture different display areas based on information associated with an external input. As another example, the electronic device may capture different display areas based on information further including information associated with an external input and information associated with an orientation of the electronic device. For example, referring to FIGS. 7, 8, and 9, the electronic device may include a flexible display 760 (e.g., the display device 160 of FIG. 1). The flexible display 760 may be divided into a first area 761 and a second area 763 around a hinge structure 710. The flexible display 760 is illustrated in FIGS. 7, 8 and 9 as being divided into two areas of the same size (e.g., a first area 761 and a second area 763), but is not limited thereto. For example, the number of divided areas, the size and resolution of each area, and/or whether content capable of being output on each area is limited may be changed according to a user's intention.

FIG. 7 illustrates an electronic device that executes a capture function in response to an external input according to an embodiment of the disclosure.

According to an embodiment of the disclosure, an electronic device may detect an external input 750 (e.g., a palm touch input) for at least one area of the flexible display 760 using at least one sensor included in a sensor module (e.g., the sensor module 376 of FIG. 3). For example, the external input 750 may refer to an image capture input for capturing one area of the display.

Referring to FIG. 7, a touch area of the external input 750 may include at least a portion of the first area 761 and the second area 763. For example, the electronic device may obtain information associated with the external input 750 using at least one sensor (e.g., the touch sensor 251 of FIG. 2) included in the electronic device. The information may include a swipe direction, touch area, and/or touch distance of a touch input. The electronic device may determine an area (e.g., a first capture area 720A or a second capture area 720B) to be captured based on information associated with the external input 750 obtained using the touch sensor. As another example, the electronic device may determine whether the external input 750 is recognized by using at least one sensor (e.g., a proximity sensor and/or foreign object detection (FOD)) included in the electronic device. The electronic device may identify that no more external input is detected on the display by using the proximity sensor and/or the FOD, determine a capture area based on an ending time of the external input, and execute a capture function. For example, a time between a time when the detection of the external input is started and a time when the detection of the external input is finished may be referred to as less than about 1 second. For example, the memory (e.g., the memory 130 of FIG. 1) may store information (e.g., a time stamp) including a time point at which the detection of the external input is started and a time point at which the detection of the external input is finished. Unless otherwise described, the description associated with FIG. 7 may be referred to, for descriptions of components having the same reference numerals in FIGS. 8 and 9.

According to an embodiment of the disclosure, the user may use the electronic device by holding it in various orientations. For example, referring to reference numeral 701, the electronic device may be used while being held in a state where the vertical direction of the housing is longer than that of the horizontal direction based on a viewpoint viewed by the user. As another example, referring to reference numeral 702, the electronic device may be used while being held in a state where the horizontal direction of the housing is longer than that of the vertical direction based on a viewpoint viewed by the user. As another example, the at least one sensor may be a 9-axis motion sensor. The electronic device (e.g., the electronic device 101 of FIG. 1) may form a virtual coordinate space based on the azimuth (or "yaw"), pitch, and roll values measured by the 9-axis motion sensor, set an area of the coordinate space to a landscape range, and set the other area of the coordinate space excluding the landscape range to a portrait range. The electronic device may detect whether the electronic device is in a portrait state or a landscape state based on a current orientation of the electronic device.

According to an embodiment of the disclosure, when the external input 750 is detected in at least a portion of the first area 761 and the second area 763 of the flexible display 760 as indicated by reference numeral 701, the electronic device may capture the first capture area 720A including a first area and a second area. For example, the external input 750 may be detected in a portion of the first area 761 and a portion of the second area 763 at substantially the same time. The touch area of the external input 750 may include both a portion of the first area 761 and a portion of the second area 763. After executing the capture function, the electronic device may display a user interface (not shown) for enabling modification (e.g., cropping, enlarging, and/or reducing) of the captured image on the flexible display 760. For example, when the captured image is modified through the user interface, the electronic device may store the modified image in a memory (e.g., the memory 330 of FIG. 3). For another example, the electronic device may execute a capture function, and store a captured image generated through the execution of the capture function in a memory (e.g., the memory 330 of FIG. 3) without displaying a separate user interface (not shown).

According to an embodiment of the disclosure, when an external input is detected in at least a portion of the first area 761 and the second area 763 of the flexible display 760, for example, as indicated by reference numeral 702, the electronic device may capture the second capture area 720B including a first area and a second area. For example, the external input 750 may refer to a palm touch input obtained by swiping an area of the display from right to left. The external input 750 may mean a touch input in which a touch area includes all of a portion of the first area 761 and a portion the second area 763, which is obtained by continuously swiping up to one area of the first area 761 after initially touching the second area 763. After executing the capture function, the electronic device may display a user interface (not shown) for enabling modification of the captured image on the flexible display 760. For example, when the captured image is modified through the user interface, the electronic device may store the modified image in a memory. For another example, the electronic device may execute a capture function, and store a captured image generated through the execution of the capture function in a memory (e.g., the memory 330 of FIG. 3) without displaying a separate user interface (not shown).

FIG. 8 illustrates an electronic device that executes a capture function in response to an external input according to an embodiment of the disclosure.

According to an embodiment of the disclosure, an electronic device may detect the external input 750 (e.g., a palm touch input) for at least one area of the flexible display 760 using at least one sensor included in a sensor module (e.g., the sensor module 376 of FIG. 3).

Referring to FIG. 8, a touch area of the external input 750 may include at least a portion of the first area 761. In other words, the external input 750 of FIG. 8 may refer to a touch input having a touch area including merely the first area 761 without including the second area 763. For example, the electronic device may obtain information associated with the external input 750 using at least one sensor (touch sensor) included in the electronic device. The information may include a swipe direction, touch area, and/or touch distance of a touch input. The electronic device may determine an area to be captured (e.g., a third capture area 720C) based on information associated with the external input 750 obtained using the touch sensor. As another example, the electronic device may determine whether the external input 750 is recognized by using at least one sensor (e.g., a proximity sensor and/or foreign object detection (FOD)) included in the electronic device. The electronic device may identify that no more external input is detected on the display by using the proximity sensor and/or the FOD, determine a capture area based on an ending time of the external input, and execute a capture function.

According to an embodiment of the disclosure, the user may use the electronic device by holding it in various orientations. For example, referring to reference numeral 703, the electronic device may be used while being held in a state where the vertical direction of the housing is longer than that of the horizontal direction based on a viewpoint viewed by the user. As another example, referring to reference numeral 704, the electronic device may be used while being held in a state where the horizontal direction of the housing is longer than that of the vertical direction based on a viewpoint viewed by the user.

According to an embodiment of the disclosure, when an external input is detected in at least a portion of the first area 761 of the flexible display 760 as indicated by reference numerals 703 and 704, the electronic device may capture the third capture area 720C including the first area. After executing the capture function, the electronic device may display a user interface (not shown) for enabling modification of the captured image on the flexible display 760. For example, when the captured image is modified through the user interface, the electronic device may store the modified image in a memory (e.g., the memory 330 of FIG. 3). For another example, the electronic device may execute a capture function, and store a captured image generated through the execution of the capture function in a memory (e.g., the memory 330 of FIG. 3) without displaying a separate user interface (not shown).

FIG. 9 illustrates an electronic device that executes a capture function in response to an external input according to an embodiment of the disclosure.

According to an embodiment of the disclosure, an electronic device may detect the external input 750 (e.g., a palm touch input) for at least one area of the flexible display 760 using at least one sensor included in a sensor module (e.g., the sensor module 376 of FIG. 3).

Referring to FIG. 9, a touch area of the external input 750 may include at least a portion of the second area 763. In other words, the external input 750 of FIG. 9 may refer to a touch input having a touch area including merely the second area 763 without including the first area 761. For example, the electronic device may obtain information associated with the external input 750 using at least one sensor (e.g., touch sensor) included in the electronic device. The information may include a swipe direction of a touch input, a touch area, and/or a touch distance. The electronic device may determine an area to be captured (e.g., a fourth capture area 720D) based on information associated with the external input 750 obtained using the touch sensor. As another example, the electronic device may determine whether the external input 750 is recognized by using at least one sensor (e.g., a proximity sensor and/or FOD) included in the electronic device. The electronic device may identify that no more external input is detected on the display by using the proximity sensor and/or the FOD, determine a capture area based on an ending time of the external input, and execute a capture function.

According to an embodiment of the disclosure, the user may use the electronic device by holding it in various orientations. For example, referring to reference numeral 705, the electronic device may be used while being held in a state where the vertical direction of the housing is longer than that of the horizontal direction based on a viewpoint viewed by the user. As another example, referring to reference numeral 706, the electronic device may be used while being held in a state where the horizontal direction of the housing is longer than that of the vertical direction based on a viewpoint viewed by the user.

According to an embodiment of the disclosure, when an external input is detected in at least a portion of the second area 763 of the flexible display 760 as indicated by reference numerals 705 and 706, the electronic device may capture the fourth capture area 720D including the second area 763. After executing the capture function, the electronic device may display a user interface (not shown) for enabling modification of the captured image on the flexible display 760. For example, when the captured image is modified through the user interface, the electronic device may store the modified image in a memory (e.g., the memory 330 of FIG. 3).

Although the electronic device is illustrated as a foldable electronic device including the hinge structure 710 in FIGS. 7, 8, and 9, the above form is exemplary and embodiments of the disclosure are not limited thereto. For example, the electronic device performing the image capturing method of the disclosure may be a slideable electronic device and/or a rollable electronic device of which at least a portion is capable of sliding out or rolling.

Figure 10:
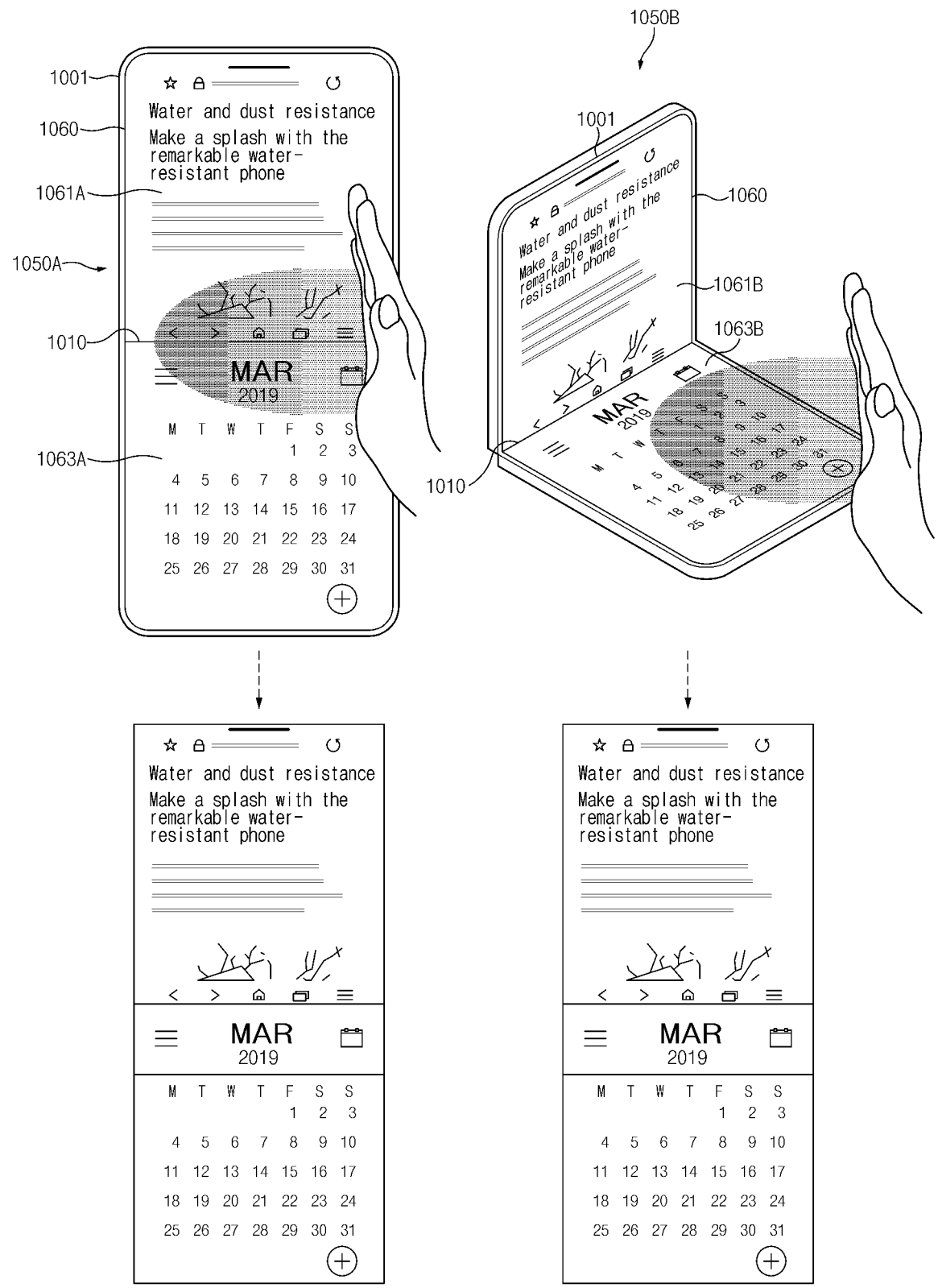
FIG. 10 illustrates an electronic device that provides various capture functions according to a change in form according to an embodiment of the disclosure.

FIG. 10 illustrates an electronic device that provides various capture functions according to a change in form according to an embodiment of the disclosure.

Referring to FIG. 10, according to an embodiment of the disclosure, an electronic device 1001 (e.g., the electronic device 101 of FIG. 1) may include a flexible display 1060 (e.g., the display device 160 of FIG. 1). The flexible display 1060 may be divided into a plurality of areas around a hinge structure 1010. For example, the electronic device 1001 may include the flexible display 1060 divided into a first area 1061A and a second area 1063A around the hinge structure 1010. The electronic device 1001 may detect an external input (e.g., a swipe touch input and/or a palm touch input) for at least one area of the flexible display 1060, and capture at least one area of the flexible display 1060 in response to the external input. The capture function may refer to an operation of obtaining an area determined based on an operation form (e.g., a first form or a second form) of the electronic device 1001 and information associated with an external input as an image file. For example, the electronic device 1001 may execute a capture function for obtaining the entire area of the display 1060, that is, an area including both the first area 1061A and the second area 1063A as an image file. As another example, the electronic device 1001 may execute a capture function for obtaining one area of the display 1060, that is, one of the first area 1061A or the second area 1063A as an image file.

According to an embodiment of the disclosure, the electronic device 1001 may store a specified condition for causing the electronic device 1001 to execute a capture function in a memory (e.g., the memory 330 of FIG. 3). For example, the specified condition may be associated with information included in the external input (e.g., at least one of a swipe direction of the external input, a touch area of the external input, or a touch distance of the external input). The electronic device 1001 may capture an area of the flexible display 1060 when the external input satisfies a specified condition. For example, the specified condition may further include information set by the electronic device 1001 or information determined based on a user's intention.

Referring to reference numeral 1050A, according to an embodiment of the disclosure, the electronic device 1001 may detect a folding angle of the hinge structure 1010 using at least one sensor (e.g., an acceleration sensor, a gyro sensor, and a switch (e.g., a contact switch) and/or a magnetic sensor (e.g., a Hall sensor)) included in a sensor module (e.g., the sensor module 176 of FIG. 1). The electronic device 1001 may determine the form of the electronic device 1001 based on the detected folding angle. For example, the form of the electronic device 1001 indicated by reference numeral 1050A may be referred to as a first form. For example, the first form may mean a state in which the first area 1061A and the second area 1063A are exposed to face one surface. The first form may mean a state in which the electronic device 1001 is not folded around the hinge structure 1010. In other words, the first form may mean a case in which the folding angle of the electronic device 1001 is 180 degrees. For example, in a case where the electronic device 1001 operating in the first form executes different functions in the first area 1061A and the second area 1063A to display different screens in the areas, the electronic device 1001 may capture an area including the touch area of an external input when the external input is detected. As another example, in a case where the electronic device 1001 displays one screen in the entire area of the flexible display 1060 by executing the same function in the first area 1061A and the second area 1063A, the electronic device 1001 may capture the entire area of the flexible display 1060 regardless of the touch area of an external input when the external input is detected.

Referring to reference numeral 1050B, according to an embodiment of the disclosure, the electronic device 1001 may detect a folding angle of the hinge structure 1010 using at least one sensor (e.g., an acceleration sensor, a gyro sensor, and a switch (e.g., a contact switch) and/or a magnetic sensor (e.g., a Hall sensor)) included in a sensor module (e.g., the sensor module 176 of FIG. 1). The electronic device 1001 may determine the form of the electronic device 1001 based on the detected folding angle. For example, the form of the electronic device 1001 indicated by reference numeral 1050B may be referred to as a second form. For example, the second form may mean a state in which a first area 1061B and a second area 1063B are exposed to face different surfaces. The second form may mean a state in which the electronic device 1001 is folded around the hinge structure 1010. In other words, the second form may mean a case in which the folding angle of the electronic device 1001 is 90 degrees. For example, in a case where the electronic device 1001 operating in the second form executes different functions in the first area 1061B and the second area 1063B to display different screens in the areas, the electronic device 1001 may capture the entire area of the flexible display 1060 regardless of the touch area of the external input. As another example, in a case where the electronic device 1001 displays one screen in the entire area of the flexible display 1060 by executing the same function in the first area 1061B and the second area 1063B, the electronic device 1001 may capture the entire area of the flexible display 1060 regardless of the touch area of an external input when the external input is detected.

Although 90 degrees and 180 degrees have been described as folding angles, which are references for identifying the forms of the electronic device 1001, they are exemplary and embodiments of the disclosure are not limited thereto. For example, the first form may be referred to as a case in which the folding angle of the electronic device 1001 is 120 degrees to 180 degrees. As another example, the second form may be referred to as a case in which the folding angle of the electronic device 1001 is 0 degree to 120 degrees.

Referring to FIG. 10, the flexible display 1060 is illustrated as being divided into two areas of the same size (e.g., the first areas 1061A and 1061B and the second areas 1063A and 1063B) but is merely an example and embodiments of the disclosure are not limited thereto. For example, the number of divided areas of the flexible display 1060, the size and resolution of each area, and/or whether content capable of being output on each area is limited may be changed according to a user's intention.

Figure 11:
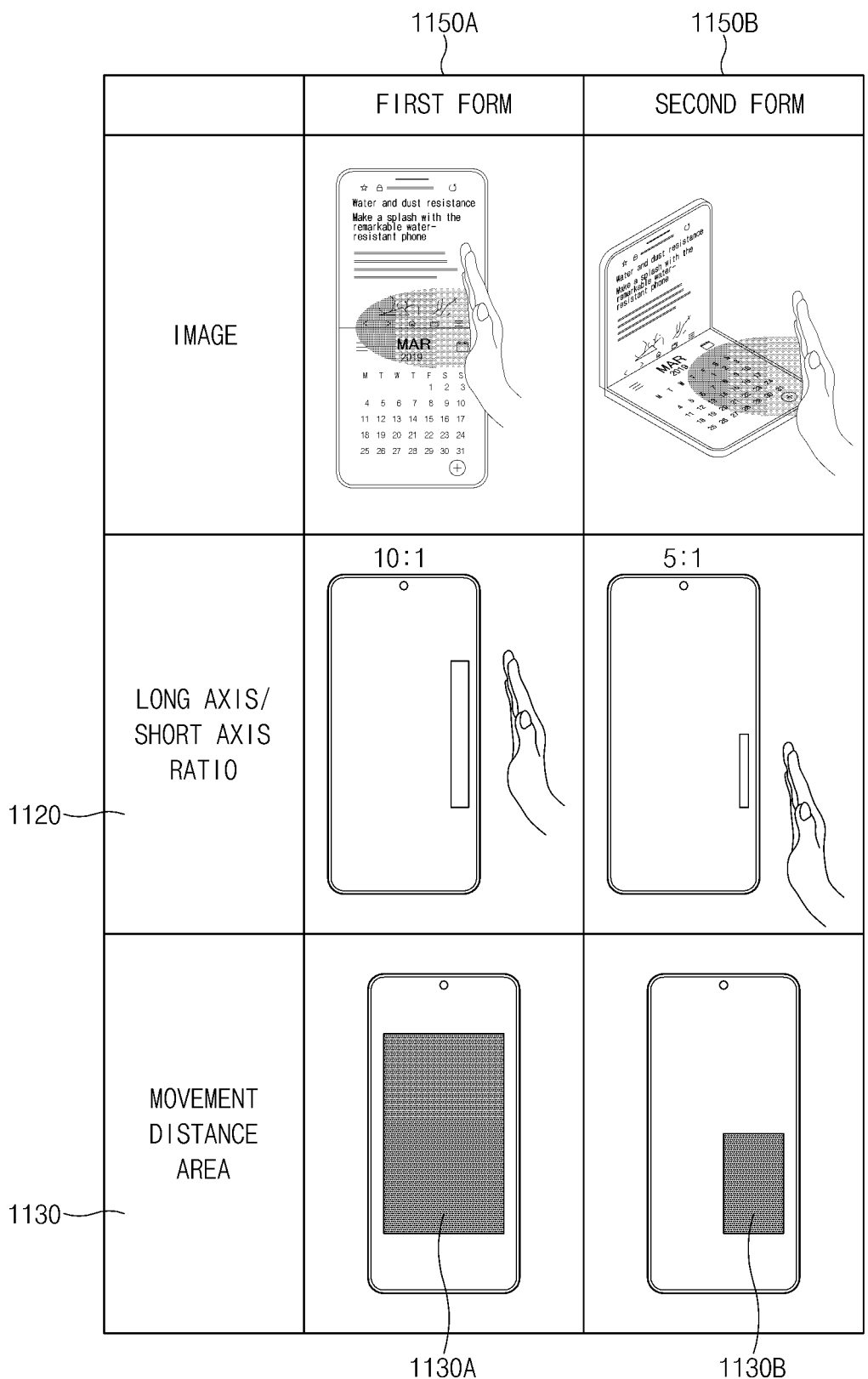
FIG. 11 illustrates an electronic device that provides various capture functions according to a change in form according to an embodiment of the disclosure.

FIG. 11 illustrates an electronic device that provides various capture functions according to a change in form according to an embodiment of the disclosure.

Referring to FIG. 11, according to an embodiment of the disclosure, an electronic device (e.g., the electronic device 101 of FIG. 1) may operate in a first form 1150A or a second form 1150B based on the folding angle of the hinge structure. For example, the first form 1150A may be referred to as a case in which the folding angle is 120 degrees to 180 degrees, and the second form 1150B may be referred to as a case in which the folding angle is 0 degree to 120 degrees.

According to an embodiment of the disclosure, the electronic device (e.g., the electronic device 101 of FIG. 1) may perform a capture function based on different specified conditions according to a change in the form (e.g., the first form 1150A or the second form 1150B). The specified condition may include information associated with an external input (e.g., image capture input) to the flexible display (e.g., the display device 160 of FIG. 1). For example, the specified condition may include information associated with at least one of a swipe direction of the external input, a touch area of the external input, and a touch distance of the external input.

According to an embodiment of the disclosure, the information associated with the touch area of the external input may include information about a long/short length ratio 1120 of the touch area. For example, when the electronic device operates in the first form 1150A, the electronic device may store, in a memory (e.g., the memory 330 of FIG. 3), a specified condition for causing the electronic device to execute a capture function when the touch area of an external input has a specified ratio (e.g., when the ratio of the major axis and the minor axis of the rectangular area corresponding to the touch area is 10:1). As another example, when the electronic device operates in the second form 1150B, the electronic device may store, in a memory, a specified condition for causing the electronic device to execute a capture function when the touch area of an external input has another specified ratio different from that of the first form 1150A (e.g., when the ratio of the major axis and the minor axis of the rectangular area corresponding to the touch area is 5:1). Although it is described with reference to FIG. 11 that ratios of the major axis and the minor axis of the rectangular area corresponding to the touch area are 10:1 and 5:1, these are values and embodiments of the disclosure are not limited thereto.

According to an embodiment of the disclosure, the information associated with the touch area of the external input may include information about an area 1130 of the touch area. When the electronic device operates in the first form 1150A, a specified area required to capture an area displayed on the flexible display may be indicated by 1130A. When the electronic device operates in the second form 1150B, a specified area required to capture an area displayed on the flexible display may be indicated by 1130B. For example, the specified condition may include information about the specified area indicating that the area 1130A of the touch area in the first form 1150A is greater than the area 1130B of the touch area in the second form 1150B. The electronic device may store, in the memory, a specified condition for causing the electronic device to execute the capture function based on the touch areas having different areas 1130A and 1130B.

According to an embodiment of the disclosure, when it is determined that the external input satisfies a specified condition, the electronic device may capture at least a portion of an area in which the external input is detected. For example, the specified condition may include at least one of information set in the electronic device in advance or information determined based on a user's intention. As described above, the electronic device may store, in the memory, a specified condition for causing the electronic device to execute the capture function according to different conditions in the first form 1150A and the second form 1150B, respectively.

Figure 12:
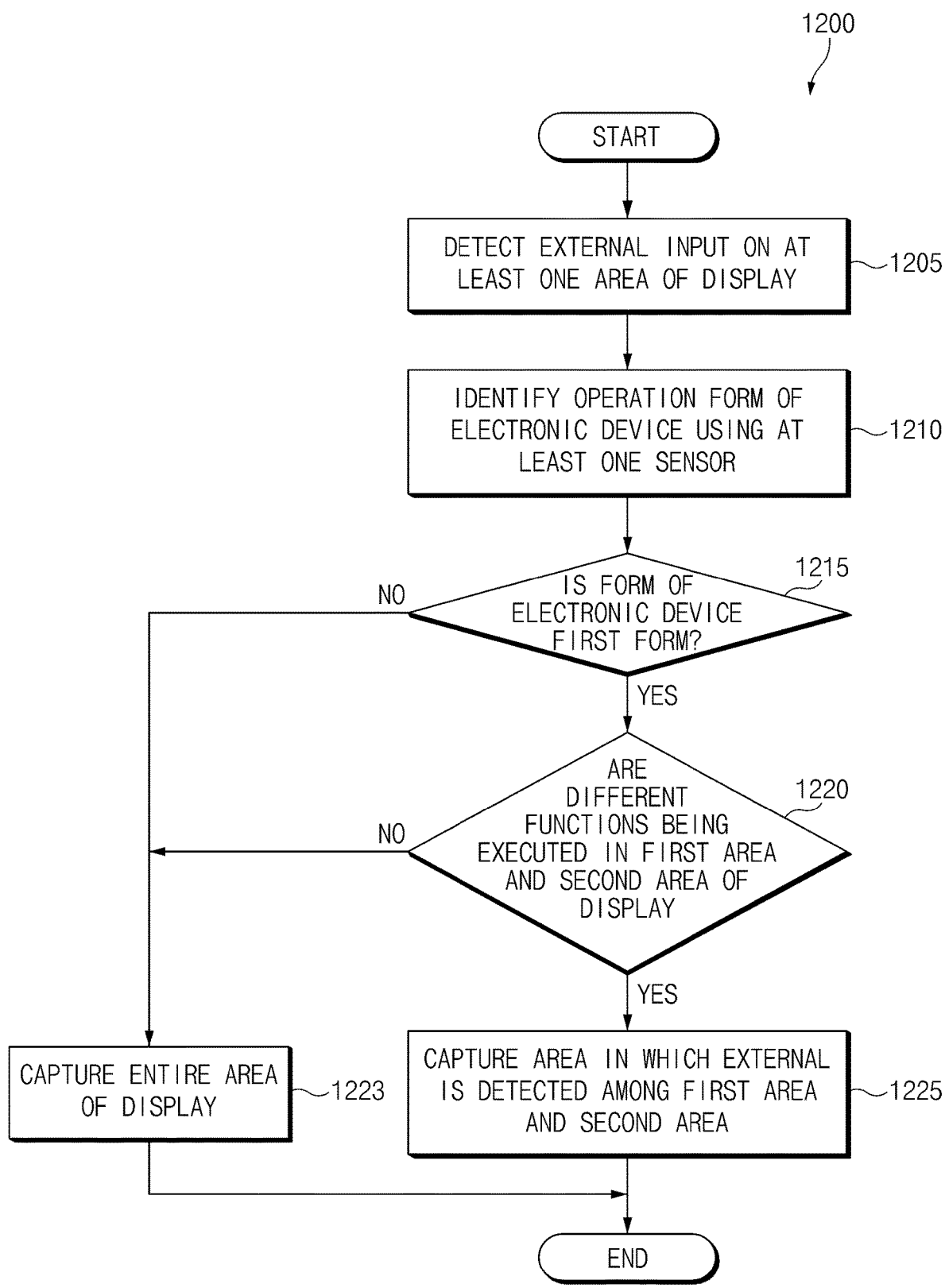
FIG. 12 is a flowchart of operation of an electronic device according to an embodiment of the disclosure.

FIG. 12 is an operation flowchart 1200 of an electronic device according to an embodiment of the disclosure.

Referring to FIG. 12, in operation 1205, an electronic device (e.g., the electronic device 101 of FIG. 1 or the processor 120 of FIG. 1) may detect an external input (e.g., image capture input) using at least one sensor (e.g., the touch sensor 251 of FIG. 2) included in a sensor module (e.g., the sensor module 176 of FIG. 1). For example, the external input may be referred to as a palm touch input of the user. The palm touch input may refer to a touch input in which a hand blade, which is a portion from the tip of the little finger to the wrist, contacts an area of the display when the palm is opened. The user may perform a palm touch input in the form of swiping from left to right or right to left while touching the display with the hand blade. The electronic device may identify the palm touch input satisfying the specified condition as the image capture input. The electronic device may detect an external input and obtain information associated with the external input (e.g., a swipe direction, a touch area, and/or a touch distance of the touch input). As another example, the electronic device may determine whether the external input is recognized by using at least one sensor (e.g., a proximity sensor and/or FOD) included in the sensor module. For example, the electronic device may identify that no more external input is detected on a display (e.g., the display device 160 of FIG. 1) using the at least one sensor. In other words, the electronic device may identify a time point when the detection of the external input starts and a time point when the detection of the external input ends using at least one sensor.

According to an embodiment of the disclosure, in operation 1210, the electronic device may identify an operation form of the electronic device using at least one sensor included in the sensor module. For example, the electronic device may identify the operation form of the electronic device by using at least one of an acceleration sensor, a gyro sensor, a switch (e.g., a contact switch), a degree sensor, and/or a magnetic sensor (e.g., a Hall sensor). For example, the electronic device may use a folding angle of a hinge structure (e.g., the hinge structure 610 of FIG. 6) obtained using at least one sensor to identify an operation form. For another example, the electronic device may identify an operation form using information on directions in which the first area and the second area of the display are oriented. In the operation flowchart 1200 of FIG. 12, operation 1210 is illustrated as being executed after operation 1205, but is not limited thereto. For example, the electronic device may periodically identify an operation form regardless of whether an external input to the display is detected. The electronic device may identify the operation form of the electronic device by using a sensor, and identify an operation form of the electronic device based on at least one of the form information of the electronic device pre-stored in a memory (e.g., the memory 330 of FIG. 3) or the form information of the electronic device set by the user in advance.

According to an embodiment of the disclosure, in operation 1215, the electronic device may determine the form of the electronic device based on the identified folding angle. For example, when the detected folding angle exceeds a specified value (e.g., about 120 degrees), the electronic device may determine the form of the electronic device to be a first form. For example, when the folding angle detected using the at least one sensor does not exceed the specified value, the electronic device may determine the form of the electronic device to be a second form. For example, the first form may mean a state in which a first area (e.g., the first area 1061A of FIG. 10) and a second area (e.g., the second area 1063A of FIG. 10) are exposed to face one surface. The first form may mean a state in which the electronic device is not folded around a hinge structure. In other words, the first form may mean a case in which the folding angle of the electronic device is 180 degrees. For example, the second form may mean a state in which the first area and the second area are exposed to face different surfaces. The second form may refer to a state in which the electronic device is folded around the hinge structure. In other words, the second form may mean a case in which the folding angle of the electronic device is 90 degrees. The first form and the second form may be referred to as an unfolding form and a folding form, respectively. Specified values (e.g., 90 degrees and 180 degrees) as references for determining the form of the electronic device may be values arbitrarily set by a user or may be preset values by a processor (e.g., the processor 320 of FIG. 3).

In operation 1215, when the form of the electronic device determined based on the folding angle is the first form (e.g., operation 1215—Yes), the electronic device may perform operation 1220.

In operation 1215, when the form of the electronic device determined based on the folding angle is not the first form (e.g., operation 1215—No), the electronic device may execute operation 1223.

In operation 1220, the electronic device may determine whether different functions are being executed in the first area and the second area of the display (e.g., the display device 160 of FIG. 1). For example, the division of the first area and the second area may be logical division of a display area. The processor may divide the display area into the first area and the second area around a hinge structure (e.g., the hinge structure 610 of FIG. 6) disposed between the first housing and the second housing of the electronic device. Although it is described that the display is divided into two areas (e.g., the first area 761 and the second area 763) in operation 1020, the disclosure is not limited thereto. For example, the number of divided areas, the size and resolution of each area, and/or whether content capable of being output on each area is limited may be changed according to a user's intention.

In operation 1223, the electronic device may capture the entire area of the display. For example, in a case where the electronic device operating in the second form executes different functions in the first area and the second area to display different screens in the areas, when an external input is detected, the electronic device may capture the entire area of the display regardless of the touch area of the external input. As another example, in a case where the electronic device executes the same function in the first area and the second area to display a single screen on the entire area of the display, when an external input is detected, the electronic device may capture the entire area of the display regardless of the touch area of the external input.

In operation 1225, the electronic device may capture at least a portion of an area in which the external input is detected among the first area and the second area of the display. For example, in a case where the electronic device operating in the first form executes different functions in the first area and the second area to display different screens in the areas, when an external input is detected, the electronic device may capture only an area including the touch area of the external input. As another example, in a case where the electronic device operating in the first form executes different functions in the first area and the second area to display different screens in the areas, when an external input is detected on at least a portion of the first area and the second area, the electronic device may capture the entire area of the display including the first area and the second area.

According to various embodiments of the disclosure, a flexible electronic device (e.g., the electronic device 101 of FIG. 1), a first housing, a second housing, a hinge structure disposed between the first housing and the second housing, a flexible display (e.g., the display device 160 of FIG. 1), at least one sensor, a processor, and a memory (e.g., the memory 330 of FIG. 1) operatively connected to the processor.

According to an embodiment of the disclosure, the memory may store one or more instructions which, when executed, cause the processor to determine a form of the flexible electronic device using the at least one sensor when an image capture input is detected in at least one area of the flexible display, determine whether different functions are executed in a first area and a second area of the flexible display divided around the hinge structure when the form of the flexible electronic device is determined to be a first form, and capture at least a portion of an area in which the image capture input is detected among the first area and the second area of the flexible display when it is determined that the different functions are being executed in the first area and the second area.

According to an embodiment of the disclosure, the first form may be an operation form in which a folding angle of the flexible electronic device is greater than a specified value, and the second form may be an operation form in which the folding angle of the flexible electronic device is less than or equal to the specified value.

According to an embodiment of the disclosure, the one or more instructions may cause, when executed, the processor to determine the form of the flexible electronic device using a folding angle of the flexible electronic device obtained using the at least one sensor or direction information of surfaces which the first area and the second area face.

According to an embodiment of the disclosure, the memory may store a specified condition of the image capture input that causes the flexible electronic device to execute a capture function, and the one or more instructions may cause, when executed, the processor to capture at least a portion of an area on which the image capture input is detected, when the image capture input satisfies the specified condition.

According to an embodiment of the disclosure, the specified condition may be associated with at least one of a swipe direction of the image capture input, a touch area of an external input, or a touch distance of the external input.

According to an embodiment of the disclosure, the at least one sensor may include a proximity sensor or foreign object detection (FOD), and the one or more instructions may cause, when executed, the processor to obtain information associated with a detection start time and a detection end time of the image capture input detected in the one area of the flexible display using the proximity sensor or the FOD, and capture at least a portion of the area on which the image capture input is detected when information, associated with the image capture input obtained during the detection start time and the detection end time, satisfies the specified condition.

According to an embodiment of the disclosure, the one or more instructions may cause, when executed, the processor to detect a change in an operation form of the flexible electronic device using a folding angle of the flexible electronic device or direction information of surfaces which the first area and the second area face, obtained using at least a part of the at least one sensor, and change the specified condition when a change in the operation form of the flexible electronic device is detected.

According to an embodiment of the disclosure, the one or more instructions may cause, when executed, the processor to change the specified condition based on a change in the form of the flexible electronic device, apply the changed specified condition and then execute a capture function.

According to an embodiment of the disclosure, the one or more instructions may cause, when executed, the processor to change the specified condition, and determine whether to execute a capture function by detecting the image capture input based on the changed specified condition.

According to an embodiment of the disclosure, the change in the specified condition according to the change in the operation form of the flexible electronic device may include a change in a ratio of an area corresponding to a touch area of the image capture input.

According to an embodiment of the disclosure, the change in the specified condition according to the change in the operation form of the flexible electronic device may include a change in an area value of an area corresponding to a touch area of the image capture input.

According to various embodiments of the disclosure, a method for providing a function of capturing one area of a flexible display in an electronic device may include determining a form of the electronic device using at least one sensor when an image capture input is detected in at least one area of the flexible display, determining whether different functions are executed in a first area and a second area of the flexible display divided around a hinge structure when the form of the electronic device is determined to be a first form, and capturing at least a portion of an area in which the image capture input is detected among the first area and the second area of the flexible display when it is determined that the different functions are being executed in the first area and the second area.

According to an embodiment of the disclosure, the method for providing a function of capturing one area of a flexible display in an electronic device may further include determining the form of the electronic device using a folding angle of the electronic device obtained using the at least one sensor or direction information of surfaces which the first area and the second area face.

According to an embodiment of the disclosure, the capturing of the at least a portion of the area in which the image capture input is detected among the first area and the second area of the flexible display when it is determined that the different functions are being executed in the first area and the second area may further include capturing at least a portion of an area on which the image capture input is detected when the image capture input satisfies a specified condition.

According to an embodiment of the disclosure, the capturing of the at least a portion of an area on which the image capture input is detected when the image capture input satisfies a specified condition may further include obtaining information associated with a detection start time and a detection end time of the image capture input detected in the one area of the flexible display using the proximity sensor or the FOD, and capturing at least a portion of the area on which the image capture input is detected when information, associated with the image capture input obtained during the detection start time and the detection end time, satisfies the specified condition.

According to an embodiment of the disclosure, the capturing of the at least a portion of an area on which the image capture input is detected when the image capture input satisfies a specified condition may further include detecting a change in an operation form of the electronic device using a folding angle of the electronic device or direction information of surfaces which the first area and the second area face, obtained using at least a part of the at least one sensor, and changing the specified condition when a change in the operation form of the electronic device is detected.

According to an embodiment of the disclosure, the changing of the specified condition when a change in the operation form of the electronic device is detected may further include changing the specified condition, and determining whether to execute a capture function by detecting the image capture input based on the changed specified condition.

According to an embodiment of the disclosure, the changing in the specified condition according to the change in the operation form of the electronic device may include a change in a ratio of an area corresponding to a touch area of the image capture input.

According to an embodiment of the disclosure, the changing of the specified condition when a change in the operation form of the electronic device is detected may further include changing an area value of an area corresponding to a touch area of the image capture input.

On the other hand, the image capture method according to various embodiments of the disclosure described above may be stored in at least one non-transitory readable medium. Such at least one non-transitory readable medium may be mounted on various devices and used.

The at least one non-transitory computer readable medium refers to a medium that stores data semi-permanently rather than a medium storing data for a very short time, such as a register, a cache, and a memory, and is readable by an apparatus. Specifically, the above-described programs may be provided by being stored in at least one non-transitory readable recording medium, such as a CD, digital video disc (DVD), a hard disk, a Blu-ray disk, a USB, a memory card, or a ROM.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A flexible electronic device comprising:
   a first housing;
   a second housing;
   a hinge structure disposed between the first housing and the second housing;
   a flexible display;
   at least one sensor;
   memory storing one or more computer programs; and
   one or more processors communicatively coupled to the flexible display, and the at least one sensor, and the memory,
   wherein the one or more computer programs include computer-executable instructions that, when executed by the one or more processors individually or collectively, cause the flexible electronic device to:
      based on an image capture input being detected in at least one area of the flexible display:
         detect a folding angle of the electronic device based on information obtained using the at least one sensor, and
         determine a form of the flexible electronic device based on the detected folding angle,
      determine whether different functions are executed in a first area and a second area of the flexible display divided around the hinge structure when the form of the flexible electronic device is determined to be a first form,
      capture an image displayed on at least a portion of an area in which the image capture input is detected among the first area and the second area of the flexible display when it is determined that the different functions are being executed in the first area and the second area, and
      capture an image displayed on the first area and the second area of the flexible display when it is determined that a same function is being executed in the first area and the second area.

2. The flexible electronic device of claim 1,
   wherein the first form is an operation form in which the folding angle of the flexible electronic device is greater than a specified value, and wherein a second form is an operation form in which the folding angle of the flexible electronic device is less than or equal to the specified value.

3. The flexible electronic device of claim 1, wherein the one or more computer programs further include computer-executable instructions that, when executed by the one or more processors individually or collectively, cause the flexible electronic device to determine the form of the flexible electronic device using a folding angle of the flexible electronic device obtained using the at least one sensor or direction information of surfaces which the first area and the second area face.

4. The flexible electronic device of claim 1,
wherein the memory stores a specified condition of the image capture input that causes the flexible electronic device to execute a capture function, and
wherein the one or more computer programs further include computer-executable instructions that, when executed by the one or more processors individually or collectively, cause the flexible electronic device to capture at least a portion of an area on which the image capture input is detected, when the image capture input satisfies the specified condition.

5. The flexible electronic device of claim 4, wherein the specified condition is associated with at least one of a swipe direction of the image capture input, a touch area of an external input, or a touch distance of the external input.

6. The flexible electronic device of claim 4,
wherein the at least one sensor includes a proximity sensor or foreign object detection (FOD), and
wherein the one or more computer programs further include computer-executable instructions that, when executed by the one or more processors individually or collectively, cause the flexible electronic device to:
obtain information associated with a detection start time and a detection end time of the image capture input detected in the one area of the flexible display using the proximity sensor or the FOD, and
capture at least a portion of the area on which the image capture input is detected when information, associated with the image capture input obtained during the detection start time and the detection end time, satisfies the specified condition.

7. The flexible electronic device of claim 4, wherein the one or more computer programs further include computer-executable instructions that, when executed by the one or more processors individually or collectively, cause the flexible electronic device to:
detect a change in an operation form of the flexible electronic device using a folding angle of the flexible electronic device or direction information of surfaces which the first area and the second area face, obtained using at least a part of the at least one sensor; and
change the specified condition when a change in the operation form of the flexible electronic device is detected.

8. The flexible electronic device of claim 7, wherein the one or more computer programs further include computer-executable instructions that, when executed by the one or more processors individually or collectively, cause the flexible electronic device to change the specified condition, and determine whether to execute the capture function by detecting the image capture input based on the changed specified condition.

9. The flexible electronic device of claim 7, wherein the change in the specified condition according to the change in the operation form of the flexible electronic device includes a change in a ratio of an area corresponding to a touch area of the image capture input.

10. The flexible electronic device of claim 7, wherein the change in the specified condition according to the change in the operation form of the flexible electronic device includes a change in an area value of an area corresponding to a touch area of the image capture input.

11. A method performed by an electronic device for providing a function of capturing one area of a flexible display in the electronic device, the method comprising:
based on an image capture input being detected in at least one area of the flexible display:
detecting, by the electronic device, a folding angle of the electronic device based on information obtained using at least one sensor, and
determining, by the electronic device, a form of the electronic device based on the detected folding angle;
determining, by the electronic device, whether different functions are executed in a first area and a second area of the flexible display divided around a hinge structure when the form of the electronic device is determined to be a first form;
capturing, by the electronic device, an image displayed on at least a portion of an area in which the image capture input is detected among the first area and the second area of the flexible display when it is determined that the different functions are being executed in the first area and the second area; and
capturing, by the electronic device, an image displayed on the first area and the second area of the flexible display when it is determined that a same function is being executed in the first area and the second area.

12. The method of claim 11,
wherein the first form is an operation form in which the folding angle of the electronic device exceeds a specified value, and
wherein a second form is an operation form in which the folding angle of the flexible display is less than or equal to the specified value.

13. The method of claim 11, further comprising:
determining the form of the electronic device using a folding angle of the electronic device obtained using the at least one sensor or direction information of surfaces which the first area and the second area face.

14. The method of claim 11, wherein the capturing of the at least a portion of the area in which the image capture input is detected among the first area and the second area of the flexible display when it is determined that the different functions are being executed in the first area and the second area further includes capturing at least a portion of an area on which the image capture input is detected, when the image capture input satisfies a specified condition.

15. The method of claim 14, wherein the specified condition is associated with at least one of a swipe direction of the image capture input, a touch area of an external input, or a touch distance of the external input.

16. One or more non-transitory computer-readable storage media storing one or more computer programs including computer-executable instructions that, when executed by one or more processors of an electronic device individually or collectively, cause the electronic device to perform operations, the operations comprising:
based on an image capture input being detected in at least one area of a flexible display of the electronic device:

detecting, by the electronic device, a folding angle of the electronic device based on information obtained using at least one sensor, and determining, by the electronic device, a form of the electronic device based on the detected folding angle;

determining, by the electronic device, whether different functions are executed in a first area and a second area of the flexible display divided around a hinge structure when the form of the electronic device is determined to be a first form;

capturing, by the electronic device, an image displayed on at least a portion of an area in which the image capture input is detected among the first area and the second area of the flexible display when it is determined that the different functions are being executed in the first area and the second area; and capturing, by the electronic device, an image displayed on the first area and the second area of the flexible display when it is determined that a same function is being executed in the first area and the second area.

17. The one or more non-transitory computer-readable storage media of claim 16, wherein the operations further comprising:

wherein the first form is an operation form in which the folding angle of the electronic device exceeds a specified value, and wherein a second form is an operation form in which the folding angle of the flexible display is less than or equal to the specified value.

18. The one or more non-transitory computer-readable storage media of claim 16, wherein the operations further comprising:

determining the form of the electronic device using a folding angle of the electronic device obtained using the at least one sensor or direction information of surfaces which the first area and the second area face.

* * * * *